United States Patent
Piazza et al.

[11] Patent Number: 6,091,428
[45] Date of Patent: Jul. 18, 2000

[54] FRAME BUFFER MEMORY SYSTEM FOR REDUCING PAGE MISSES WHEN RENDERING WITH COLOR AND Z BUFFERS

[75] Inventors: Thomas A. Piazza, Granite Bay, Calif.; Matthew Radecki, Oviedo, Fla.

[73] Assignee: Real 3D, Inc., Orlando, Fla.

[21] Appl. No.: 09/053,590

[22] Filed: Apr. 1, 1998

[51] Int. Cl.[7] .................................................... G09G 5/36
[52] U.S. Cl. ........................ 345/509; 345/515; 345/422; 345/1
[58] Field of Search .................................. 345/422, 186, 345/501, 507–509, 515, 516, 510

[56] References Cited

U.S. PATENT DOCUMENTS

| | | | |
|---|---|---|---|
| 5,758,045 | 5/1998 | Moon et al. | 345/422 |
| 5,937,204 | 8/1999 | Schinnerer | 345/508 |
| 5,945,997 | 8/1999 | Zhao et al. | 345/430 |

Primary Examiner—Kee M. Tung
Attorney, Agent, or Firm—Scully, Scott, Murphy & Presser

[57] ABSTRACT

In a computer image generation system, a method for reducing page switches when rendering polygons to a color and Z-buffer using a memory subsystem with N banks of memory. The method is performed by first allocating the pages of a first memory subsystem (Z-buffer or color) to consecutive and contiguous pages of the frame buffer memory, where the individual frame buffer memory pages reside in one of N banks of memory. The second memory subsystem(Z-buffer or color)is then allocated according to the following rule: the allocation of the second memory subsystem is made such that its first page does not reside in a memory bank whose index is equal to the index of the memory bank allocated to the first page of the memory subsystem. The allocation rule effectively reduces page switches by virtue of being able to access different memory banks for both Z-buffer and color read and writes thereby by avoiding the computational costs associated with opening multiple memory pages in the same memory bank.

11 Claims, 2 Drawing Sheets

Frame Buffer : Color Buffer Memory Subsystem

Frame Buffer : Z-Buffer Memory Subsystem

Frame Buffer : Color Buffer Memory Subsystem

Increase size of color buffer memory by 1 additional page

Frame Buffer : Z-Buffer Memory Subsystem

Start z-buffer on ODD page boundary

FRAME BUFFER MEMORY SYSTEM FOR REDUCING PAGE MISSES WHEN RENDERING WITH COLOR AND Z BUFFERS

BACKGROUND OF THE INVENTION

1. Technical Field

The present invention relates generally to computer graphics, and more particularly to a method for reducing page switches when rendering polygons in a frame buffer comprising multiple banks of memory.

2. Description of the Prior Art

The implementation of 3D graphics is a computationally intensive operation involving multiple processing stages in dedicated graphics rendering hardware, commonly referred to as "graphics engines" or "graphics accelerators". Most of the complex operations in the graphics engine are performed on the pixel level. Some of the more complex operations performed by the graphics engines include anti-aliasing, trilinear interpolation, and z-buffering. These and other advanced 3D rendering techniques greatly enhance the level of realism in 3D imagery. Rendering a display scene to an observer involves taking a three-dimensional model of some area of the world which consists of multiple 3D objects. The objects are typically stored in a data base as a composite of polygons. An image generator would read in each 3D object, polygon by polygon, and transform it into a 2D scene description. The 2D scene description is ultimately converted to analog video which is presented to a user on a display device. Given a set of 3D objects and a viewing specification, a determination must be made concerning which lines or surfaces of the objects are visible so that only visible lines and surfaces are displayed. The z-buffer or depth-buffer algorithm is one of the simplest and widely utilized visible-surface algorithms available to perform this task. The z-buffer algorithm serves to maintain the correct perspective between objects which are closer to a viewpoint than others. The largest value that can be stored in the z-buffer represents that value associated with the distance closest to the current projection plane. When a new polygon is being rendered, the rendering engine compares the z-values of its vertices to the previously stored z-value in the same (x,y) location in the z-buffer. The previously stored z-value would have been associated with a previously rendered polygon.

To perform z-buffering a frame buffer is required that consists of memory subsystems capable of storing pixel data associated with color and depth values. Color values would be stored in a color buffer memory subsystem and depth values in a z-buffer memory subsystem. The computation of the z-value is well known in the prior art and is computed by plugging the (x,y) pixel value pair into the plane equation for the polygon. If the new point, associated with the polygon being processed, has a z value greater than the previous one (i.e closer to the projection plane), its z-value is placed in the z-buffer, replacing the previous z-value; otherwise the previous z-value remains in the z-buffer. Therefore, z-buffer processing in its most general description involves reading from a z-buffer, comparing the value read to a value associated with the polygon currently being processed and possibly overwriting the current z-buffer value with the new value. In those situations where a z-buffer value is to be overwritten a corresponding overwrite will occur to the color buffer.

The color buffer and z-buffer are each organized as a series of contiguous pages in the frame buffer where each page defines a fixed number of storage positions associated with some number of pixels in the display device. As an example of how frame buffer pages define pixels in a raster display, typical line rendering systems associate the storage locations of a single frame buffer page to approximately one and one-quarter horizontal scan lines of a raster display device. As each polygon is processed by the graphics engine, color and z-buffer memory pages of the frame buffer are accessed to either read or write pixel data. A page switch occurs whenever a page in the frame buffer memory is accessed to perform a read/write, where the page index of the accessed page is different from the index of the page most recently accessed. The newly accessed page is said to be activated. An undesirable overhead cost of some fixed number of clock cycles is incurred whenever a page switch occurs and a new page is activated. The cost becomes significant when performing z-buffering in either a tile or linear address rendering system when in the performance of the z-buffering algorithm the color and z-buffers are written to in immediate succession. In contrast, successive read/writes to the same buffer, such as z or color, are coherent and result in no page switches.

For the above reasons, there is a need in the art for a simple method for reducing the number of page switches when rendering polygons to a color and Z buffer using a memory subsystem that has multiple banks of memory.

SUMMARY OF THE INVENTION

It is an object of the present invention to provide a method for reducing page switches when rendering polygons to a tiled color and Z buffer using a memory subsystem with multiple banks of memory.

In order to attain the above object, according to the present invention, there is provided a method for reducing page switches by allocating the first page of both the color and Z-buffer to frame buffer pages located within different memory banks. When interleaved accesses are made between the z-buffer and the color buffer memory subsystems,(i.e. a z-buffer access followed by a color buffer access), page switching is significantly reduced as a consequence of accessing two independently addressable banks of memory. A page switch occurs only once in each memory bank to activate the page in each respective bank. All subsequent read/writes thereafter, for a particular pixel, occur in the same activated page in each memory bank. No page switch overhead costs are incurred as a result.

DETAILED DESCRIPTION OF THE PREFERRED EMBODIMENTS

The general organization of a frame buffer is to divide the frame buffer into N banks of memory, where N is some positive integer. Each bank of memory is independently addressable in any clock cycle and each bank is further comprised of M pages of the frame buffer memory, where M is also some positive integer.

Figure 1:
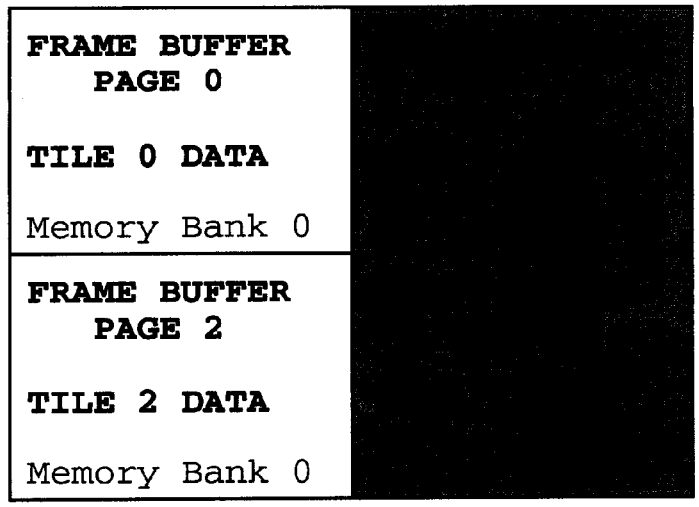
FIG. 1 Illustrates a frame buffer organization of the prior art comprising color and z-buffer memory subsystems in two banks of memory.
Figure 1:
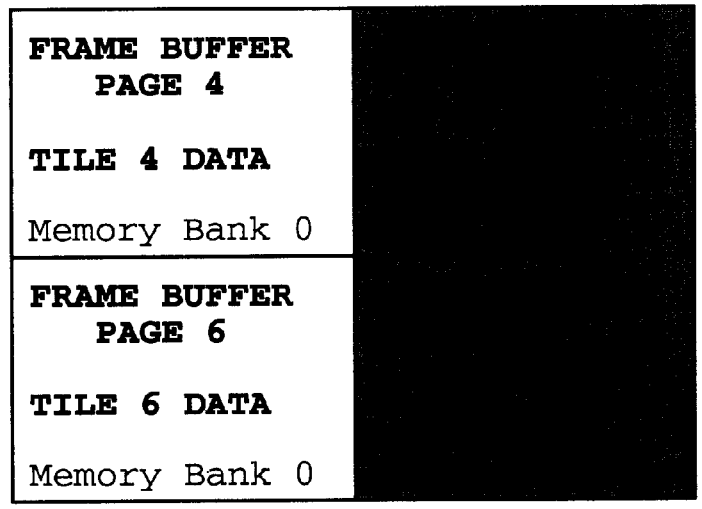

FIG. 1 illustrates how frame buffer pages are allocated in accordance with the prior art for a frame buffer 10 with two memory banks, 12, 14 numbered banks zero and one. FIG. 1 illustrates the allocation of the pages of the color memory subsystem 16 pages 0,1,2,3 of the frame buffer, followed by the allocation of the z-buffer memory subsystem 18 to frame buffer pages 4,5,6,7. Pages 8–13 may include data from other memory subsystems. This allocation scheme places the color and z-buffer subsystems 16 and 18 in consecutive order in the frame buffer 10 with the last page 3 of the color memory subsystem being contiguous with the first page 4 of the z-buffer memory subsystem 18. With this arrangement if the color memory subsystem began on an even page, the z-buffer memory subsystem would also begin on an even page. Similarly, if one memory subsystem began on an odd page, the other would also begin on an odd page.

Referring now to Table I below together with FIG. 1, the problem of incurring excessive page switches when performing z-buffering according to the memory subsystem allocation scheme of the prior art is illustrated by example. The table describes the required steps (read/write operations) to perform z-buffering operations on two representative pixels, (0,0) and (0,1).

page four as per the stated initial condition. More particularly, the initial condition states that the most recently accessed page in memory bank zero was a page in a memory subsystem other than the color or z-buffer (i.e. other than pages 0–7). The last column at step 2 indicates that the page switch occurred from an Unkown page (?) of the memory subsystem other than z or color (i.e. other than pages 0–7) to page 4 of the z-buffer memory subsystem. Step 3 describes the next z-buffering operation associated with pixel (0,0), a z-buffer write. This operation is said to be coherent with the previous operation at step 2 in that it requires an access to a currently active page, therefore no page switch occurs for this operation. Step 4 defines the last z-buffer operation associated with pixel (0,0), a color write operation. Referring now to FIG. 1 it is observed that the color buffer information for pixel (0,0) resides in page zero. This operation involves a page switch from the currently active page, page 4, to page 0 as indicated on line 4 of table I.

Steps 5–7 are the process steps associated with z-buffering for pixel (1,0). At step 5, a z-buffer read is

TABLE I

Page switch occurrence with a conventional tiled frame buffer organization

| Step | OPERATION | PAGE (TILE) ACCESSED | The current active page for Memory Bank 0 (all even tiles) | The current active page for Memory Bank 1 (all odd tiles) | Did a page Switch occur ? |
|---|---|---|---|---|---|
| | | INITIAL CONDITION | | | |
| 1 | Initial Condition | N/A | Active Page Unknown but assumed to be other than z or color buffer | Active Page Unkown but assumed to be other than z or color buffer | N/A |
| | | PIXEL (0,0) Z-BUFFER OPERATIONS : STEPS 2,3,4 | | | |
| 2 | Pixel (0,0) Z-buffer read | 4 | 4 | Active Page remains Unkown | YES ( ? to 4 ) |
| 3 | Pixel (0,0) Z-buffer write | 4 | 4 | Active Page remains Unkown | NO |
| 4 | Pixel (0,0) Color write | 0 | 0 | Active Page remains Unkown | YES ( 4 to 0 ) |
| | | PIXEL (1,0) Z-BUFFER OPERATIONS : STEPS 5,6,7 | | | |
| 5 | Pixel (1,0) Z-buffer read | 4 | 4 | Active Page remains Unkown | YES ( 0 to 4 ) |
| 6 | Pixel (1,0) Z-buffer write | 4 | 4 | Active Page remains Unkown | NO |
| 7 | Pixel (1,0) Color write | 0 | 0 | Active Page remains Unkown | YES ( 4 to 0 ) |

While only the color and z-buffer memory subsystems are explicitly shown in FIG. 1, it is assumed that the frame buffer is comprised of multiple memory subsystems. It is further assumed that the currently active page in each bank of memory is a page associated with a memory subsystem other than color or z-buffer. Step 1 of the table describes this initial condition. Steps 2–4 of the table describe the read/write operations to perform z-buffering for pixel (0,0). At step 2 a z-buffer read is performed. To carry out a Z-buffer read for this pixel it is necessary to access (activate) page four of the z-buffer. Page four resides in memory bank 0, see FIG. 1. A page switch occurs as a consequence of accessing required. An access is required to page 4 of the z-buffer memory subsystem to satisfy this operation. Since this page access is different from the current active page, page 0, a page switch is said to occur as indicated in the last column. The next operation at step 6 is a z-buffer write. This operation is coherent with the previous operation requiring a second access to an already active page, consequently no page switch occurs. At step 7, a color write is performed requiring access to page 0 of the color memory subsystem. A second page switch for pixel (1,0) occurs as a result of the current active page, page 4, being other than page 0.

Figure 2:
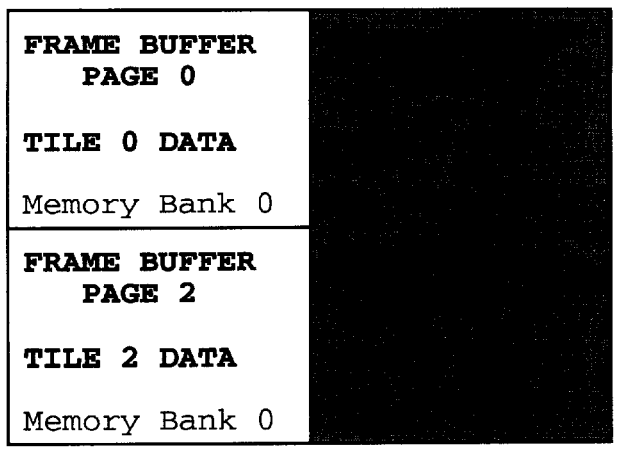
FIG. 2 Illustrates a frame buffer organization of the present method comprising color and z-buffer memory subsystems in two banks of memory.
Figure 2:
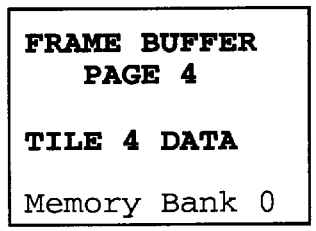
Figure 2:
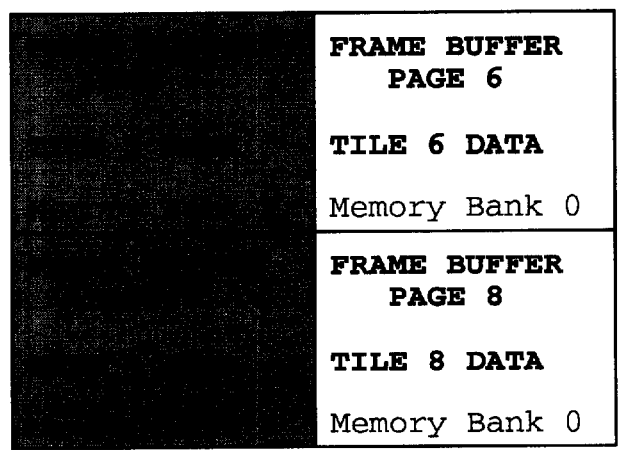

Table II illustrates that all six memory accesses were made to pages contained in the same memory bank, memory bank 0. As a result every time a memory access interleaves from the color memory subsystem to the Z-buffer memory subsystem, or from Z to color, a page switch occurs resulting in two page switches for every pixel fill, as shown at steps 2,4,5 and 7 of Table II. With each page switch there is an associated overhead cost of some fixed number of clock cycles. Coherent operations, described at steps 3 and 6, by contrast, incurred no page switches Referring now to FIG. 2 together with Table II, there is illustrated the allocation scheme of the present invention. FIG. 2 illustrates a framebuffer 20, having a color subsystem 22 in pages 0,1,2,3,4 and a z-buffer subsystem 24 in pages 5,6,7,8. As shown in FIG. 2, the color subsystem 22 has been extended by one additional page, page four, beyond its four page requirement, pages (0–3) as shown in FIG. 1. The additional page causes the first page of the z-buffer memory subsystem 24 to be allocated to a memory bank 26, bank 1, different than the memory bank 28, bank 0, allocated to the first page of the color buffer 22. The required read/write operations made to the color and z-buffers 22, 24 to perform z-buffering are described in Table II for two representative pixels(0,0) and (1,0). The initial condition is the same as described in Table I, whereby the current active page is assumed to be in a memory subsystem other than z-buffer or color. Steps 2–4 of the table describe the read/write operations to perform z-buffering for pixel (0,0). At step 2 a z-buffer read is performed. To carry out a Z-buffer read for this pixel it is necessary to access page 5, see FIG. 2. Under the allocation scheme of the present method page 5 resides in memory bank 1. As a result of this operation a page switch is said to occur since the most recently accessed page in memory bank 1 was in a memory subsystem other than the z-buffer as per the initial condition. The question mark in the last column indicates that the switch occurred from a page of a memory subsystem other than z-buffer or color to page 5 of the z-buffer.

Step 5 describes the first z-buffering operation associated with pixel (1,0), a z-buffer read. An access to page 5 is required to satisfy this operation. No page switch occurs because the page to be accessed resides in a different memory bank than the one accessed in the previous operation at step 4. More particularly, the access at step 5 is made to memory bank 1, whereas the access at step 4 is made to memory bank 0.

Step 6 describes the next z-buffering operation associated with pixel (1,0), a z-buffer write. This operation is coherent in that it requires an access to a currently active page, page 5. Coherent operations do not result in page switches since they access currently active pages.

Step 7 is a color write operation. Referring now to FIG. 2 it is observed that the color buffer information for pixel (1,0) resides in page zero of memory bank 0. This operation does not involve a page switch because the access is made to a page, page 5, of the color memory subsystem that resides in a different memory bank, bank 1, than the memory bank, memory bank 0, associated with the previous access at step 6.

Table II illustrates that as a consequence of the allocation scheme of the present method, memory accesses were made to both memory banks, zero and one. In contrast to the allocation scheme of the prior art, every time a memory access transitions (interleaves) from the color memory subsystem to the Z-buffer memory subsystem, or from Z to color, no pages switch results.

TABLE II

Page switch occurrence with a tiled frame buffer organization of the present method

| Step | OPERATION | PAGE (TILE) ACCESSED | The current active page for Memory Bank 0 (all even tiles) | The current active page for Memory Bank 1 (all odd tiles) | Did a page switch occur ? |
|---|---|---|---|---|---|
| | | INITIAL CONDITION | | | |
| 1 | Initial Condition | N/A | Active Page Unkown but assumed to be other than z or color buffer | Active Page Unkown but assumed to be other than z or color buffer | N/A |
| | | PIXEL (0,0) Z-BUFFER OPERATIONS : STEPS 2,3,4 | | | |
| 2 | Pixel (0,0) Z-buffer read | 5 | Active Page remains Unkown | 5 | YES ( ? to 5) |
| 3 | Pixel (0,0) Z-buffer write | 5 | Active Page remains Unkown | 5 | NO |
| 4 | Pixel (0,0) Color write | 0 | 0 | 5 | YES ( ? To 0 ) |
| | | PIXEL (1,0) Z-BUFFER OPERATIONS : STEPS 5,6.7 | | | |
| 5 | Pixel (1,0) Z-buffer read | 5 | 0 | 5 | NO |

TABLE II-continued

Page switch occurrence with a tiled frame buffer organization of the present method

| Step | OPERATION | PAGE (TILE) ACCESSED | The current active page for Memory Bank 0 (all even tiles) | The current active page for Memory Bank 1 (all odd tiles) | Did a page switch occur ? |
|---|---|---|---|---|---|
| 6 | Pixel (1,0) Z-buffer write | 5 | 0 | 5 | NO |
| 7 | Pixel (1,0) Color write | 0 | 0 | 5 | NO |

Table II. shows that page switches are significantly reduced by virtue of the allocation scheme of the present invention. As a consequence all z-buffer accesses went to memory bank one and all color buffer accesses went to bank zero. A single page switch occurred in each memory bank to initially activate the pages of the color and z-buffers but none occurred after that. It is also observed that the opposite condition can occur (color accesses in bank 0, and Z buffer accesses in bank 1), but the number of page switches would be the same. The benefits of the method of the present invention are realized so long as the following rule is satisfied: The allocation of a first page of a second contiguous memory subsystem must be made to a memory bank different from the allocation of a first page of a first memory subsystem.

The preceding analysis has been described for Tiled surfaces. A Similar analysis can be made that shows this arrangement of memory is advantageous for linear (non-tiled) color and Z surfaces. Consider, for example, a surface arranged linearly, that has a pitch of 1024 pixels and a height of 768 pixels, each pixel being 2 bytes in size. The pitch of the surface measured in bytes would be 2048 bytes. A memory subsystem with 2048 bytes to a page is assumed. Each horizontal line would be a page in size. If the first pixel were page aligned, then each line would consist of exactly one page. If two surfaces (color and Z buffer) were allocated, the color surface may begin at page zero, and continue through page 767. If the Z surface followed immediately afterward, the Z surface would start at page 768, and run through page 1535.

Table III. illustrates by example how z-buffering is performed for two representative pixels under a conventional allocation scheme utilizing a linear memory organization. The table describes the required steps (read/write) operations to perform z-buffering on two representative pixels, (3,3) and (4,3).

TABLE III

Page switch occurrence with a linear frame buffer organization of the prior art

| Step | OPERATION | PAGE ACCESSED | The current active page for Memory Bank 0 (all even pages) | The current active page for Memory Bank 1 (all odd pages) | Did a page switch occur ? |
|---|---|---|---|---|---|
| | | INITIAL CONDITION | | | |
| 1 | Initial Condition | N/A | Active Page Unknown (?)but assumed to be other than Z or color buffer | Active Page Unknown (?) but assumed to be other than Z or color buffer | N/A |
| | PIXEL (3,3) Z-BUFFER AND COLOR OPERATIONS : STEPS 2,3,4 | | | | |
| 2 | Pixel (3,3) Z-buffer read | 771 | Active Page remains Unknown | 771 | YES ( ? to 771) |
| 3 | Pixel (3,3) Z-buffer write | 771 | Active Page remains Unknown | 771 | NO |
| 4 | Pixel (3,3) Color Write | 771 | Active Page remains Unknown | 3 | YES (771 to 3) |
| | PIXEL (4,3) Z-BUFFER AND COLOR OPERATIONS : STEPS 5,6,7 | | | | |
| 5 | Pixel (4,3) Z-buffer read | 771 | Active Page remains Unknown | 771 | YES (3 to 771) |

TABLE III-continued

Page switch occurrence with a linear frame buffer organization of the prior art

| Step | OPERATION | PAGE ACCESSED | The current active page for Memory Bank 0 (all even pages) | The current active page for Memory Bank 1 (all odd pages) | Did a page switch occur ? |
|---|---|---|---|---|---|
| 6 | Pixel (4,3) Z-buffer write | 771 | Active Page remains Unknown | 771 | NO |
| 7 | Pixel (4,3) Color write | 3 | Active Page remains Unknown | 3 | YES (771 to 3) |

While only the color and z-buffer memory subsystems are described in Table III. it is assumed that the frame buffer is comprised of multiple memory subsystems. As was true in the previous tiled examples, the initial condition of assuming that the currently active page in each bank of memory is a page associated with a memory subsystem other than the color or z-buffer memory subsystems holds true with equal weight in this example. Step 1 of the table describes this initial condition.

Steps 2 and 3 of the table describe the read/write operations to perform z-buffering for pixel (3,3). At step 2 a z-buffer read is performed. To carry out a Z-buffer read for this pixel it is necessary to access (activate) page 771 of the z-buffer. Page 771 resides in memory bank 1. A page switch occurs as a consequence of accessing page 771 as per the stated initial condition. More particularly, the initial condition states that the most recently accessed page in memory bank one was a page in a memory subsystem other than the color or z-buffer (i.e. other than pages 0–767 and 768–1535). The last column at step 2 indicates that the page switch occurred from an Unknown page (?) of the memory subsystem to page 771.

Step 3 describes the next z-buffering operation associated with pixel (3,3), a z-buffer write. This operation is said to be coherent with the previous operation at step 2 in that it requires an access to a currently active page, page 771, therefore no page switch occurs for this operation.

Step 4 defines a color write operation. This operation incurs a page switch from a currently active page, page 771, to page 3 as indicated on line 4 of Table III. Note that the page switch results as a consequence of both pages residing in the same memory bank, bank 1.

Steps 5–7 are the process steps associated with z-buffering for pixel (4,3). At step 5, a z-buffer read is required. An access is required to page 771 of the z-buffer memory subsystem to satisfy this operation. A page switch occurs since a different page from the most recently accessed page, page 3, must be accessed to satisfy this operation. The next step, step 6, involves a z-buffer write operation. This operation is coherent with the previous operation requiring a second access to a currently active page, consequently no page switch occurs.

At step 7, a color write is performed requiring access to page 3 of the color memory subsystem. A second page switch is incurred for pixel (4,3) as a result of the current active page, page 771, being other than the page required by the current operation, page 3.

Table III illustrates that all six memory accesses were made to pages contained in the same memory bank, memory bank 1. As a result every time a memory access interleaves from the color memory subsystem to the Z-buffer memory subsystem, or from Z to color, a page switch occurs resulting in two page switches for every pixel fill, as shown at steps 2,4,5 and 7 of Table III. With each page switch there is an associated overhead cost of some fixed number of clock cycles. Coherent operations, described at steps 3 and 6, by contrast, incurred no page switches.

Table IV illustrates by example how z-buffering is performed for two representative pixels under the method of the present invention utilizing a linear memory organization. The Z memory subsystem is aligned to begin on page 769 instead of page 768 as was true under a conventional allocation scheme. This is accomplished by extending the color memory subsystem one page beyond its previously defined last page, page 767.

TABLE IV

Page switch occurrence with a linear frame buffer organization of the prior art

| Step | OPERATION | PAGE ACCESSED | The current active page for Memory Bank 0 (all even pages) | The current active page for Memory Bank 1 (all odd pages) | Did a page switch occur ? |
|---|---|---|---|---|---|
| | | | INITIAL CONDITION | | |
| 1 | Initial Condition | N/A | Active Page Unknown (?)but assumed to be other than Z or color buffer | Active Page Unknown (?) but assumed to be other than Z or color buffer | N/A |

TABLE IV-continued

Page switch occurrence with a linear frame buffer organization of the prior art

| Step | OPERATION | PAGE ACCESSED | The current active page for Memory Bank 0 (all even pages) | The current active page for Memory Bank 1 (all odd pages) | Did a page switch occur ? |
|---|---|---|---|---|---|
| PIXEL (3,3) Z-BUFFER AND COLOR OPERATIONS : STEPS 2,3,4 | | | | | |
| 2 | Pixel (3,3) Z-buffer read | 772 | 772 | Active Page remains Unknown | YES ( ? to 771) |
| 3 | Pixel (3,3) Z-buffer write | 772 | 772 | Active Page remains Unknown | NO |
| 4 | Pixel (3,3) Color Write | 3 | 772 | Active Page remains Unknown | NO |
| PIXEL (4,3) Z-BUFFER AND COLOR OPERATIONS : STEPS 5,6,7 | | | | | |
| 5 | Pixel (4,3) Z-buffer read | 772 | 772 | 3 | YES ( ? to 3) |
| 6 | Pixel (4,3) Z-buffer write | 772 | 772 | 3 | NO |
| 7 | Pixel (4,3) Color write | 3 | 772 | 3 | NO |

The required read/write operations made to the color and z-buffers to perform z-buffering are described in Table IV for two representative pixels (3,3) and (4,3). These operations are identical to those described in the previous example, illustrated by Table III for the purpose of comparing and contrasting the conventional allocation scheme with the method of the present invention. The initial condition is described to be the same as that defined in the previous example. To reiterate, the initial condition specifies that the current active page is assumed to be in a memory subsystem other than z-buffer or color.

Steps 2–3 of the table describe the read/write operations to perform z-buffering for pixel (3,3). At step 2 a z-buffer read is performed. To carry out a Z-buffer read for this pixel it is necessary to access page 772. As a result of this operation a page switch occurs since the most recently accessed page was from a memory subsystem other than the z-buffer as per the stated initial condition.

Step 3 describes the next z-buffering operation associated with pixel (3,3), a z-buffer write. This operation is coherent in that it requires an access to an already active page, page 772 of the z-buffer. Coherent operations do not result in page switches.

Step 4 is a color write operation. This operation does not involve a page switch. This allocation scheme causes the color write operation, defined at step 4, to access an odd page, page 3, in memory bank 1. Whereas the previous operation required an access from an even page, page 772, in bank 0.

Steps 5–7 are the process steps associated with z-buffering for pixel (4,3). At step 5, a z-buffer read is required. An access is required to page 772 of the z-buffer memory subsystem to satisfy this operation. Since this page access is different from the current active page, page 3, a page switch is said to occur as indicated in the last column.

Step 6 describes the next z-buffering operation associated with pixel (1,0), a z-buffer write. This operation is coherent in that it requires an access to an already active page, page 5 of the z-buffer. Coherent operations do not result in page switches.

Step 7 is a color write operation. This operation does not involve a page switch because the access is made to a page, page 5, of the color memory subsystem that resides in a different memory bank, bank 1, than that associated with the previous access at step 6, bank 0.

Table IV illustrates that as a consequence of the allocation scheme of the present method, memory accesses were made to both memory banks, zero and one. Every time a memory access transitions (interleaves) from the color memory subsystem to the Z-buffer memory subsystem, or from Z to color, no pages switch results, in contrast to the allocation scheme of the prior art, as depicted in Table III.

While the benefits of the present method have been described with reference to an illustrative embodiment for two memory banks, the method is easily extendible to frame buffer memories comprising any number of banks of memory. By example, consider a memory subsystem with four banks of memory (0–3). If the first page of the color buffer began on a page that resides in bank zero, then the method would require that the Z-buffer memory subsystem begin on a page which resides in a bank other than bank zero. As a result, page misses would be reduced.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A method for allocating pages of a first and a second memory subsystem to pages of a frame buffer memory, wherein said frame buffer memory is comprised of N banks of memory with index 0 to N−1, and where each bank is further comprised of M pages, each page having a first data memory location address defining a starting page boundary, the method comprising the steps of:

a) aligning the first data memory location of a first page of said first memory subsystem to page X of the frame buffer where 0<X<M*N, and where page X is located in a first memory bank;

b) aligning all subsequent pages of said first memory subsystem to consecutive contiguous frame buffer pages of the frame buffer;

c) aligning the first data memory location of a first page of said second memory subsystem to a memory bank other than the first memory bank;

d) aligning all subsequent pages of said second memory subsystem to consecutive frame buffer pages of the frame buffer.

2. The method according to claim 1, where the first memory subsystem is a color memory subsystem and where the second memory subsystem is a z-buffer memory subsystem.

3. The method according to claim 1, where the first memory subsystem is a z-buffer memory subsystem and where the second memory subsystem is a color memory subsystem.

4. The method in accordance with claims 2 or 3, wherein said color memory subsystem is configured as a plurality of tiles wherein a tile size is defined by a fixed number of frame buffer memory locations.

5. The method in accordance with claim 4, wherein said plurality of tiles are of a tile size equal to the size of a page of memory.

6. The method in accordance with claims 2 or 3, wherein said z-buffer memory subsystem is configured as a plurality of tiles wherein a tile size is defined by a fixed number of frame buffer memory locations.

7. The method in accordance with claim 6, wherein said plurality of tiles are of a tile size equal to the size of a page of memory.

8. The method according to claim 1, where a color and z-buffer memory subsystems reside in the frame buffer, and the first memory subsystem is a color memory subsystem and where the second memory subsystem is a z-buffer memory subsystem.

9. The method according to claim 1, where a color and z-buffer memory subsystems reside in the frame buffer, and where the first memory subsystem is a z-buffer memory subsystem and where the second memory subsystem is a color memory subsystem.

10. The method according to claim 1, where page X resides in a bank Y, where Y is the remainder of an integer division of X by N.

11. A method for reducing page switches when accessing a frame buffer memory, wherein said frame buffer memory is comprised of N banks of memory with index 0 to N−1, and where each bank is further comprised of M pages, each page having a first data memory location address defining a starting page boundary, the method comprising the steps of:

a) aligning the first data memory location of a first page of a first memory subsystem to page X of the frame buffer where 0<X<M*N, and where page X is located in a first memory bank;

b) aligning all subsequent pages of said first memory subsystem to consecutive contiguous frame buffer pages of the frame buffer;

c) aligning the first data memory location of a first page of a second memory subsystem to a memory bank other than the first memory bank;

d) aligning all subsequent pages of said second memory subsystem to consecutive frame buffer pages of the frame buffer;

e) accessing a page of memory belonging to a first memory subsystem, located in a first memory bank;

f) accessing a page of memory belonging to a second memory subsystem located in a second memory bank.

* * * * *